(12) United States Patent
Drako

(10) Patent No.: US 7,930,428 B2
(45) Date of Patent: Apr. 19, 2011

(54) VERIFICATION OF DNS ACCURACY IN CACHE POISONING

(75) Inventor: Dean Drako, Los Altos, CA (US)

(73) Assignee: Barracuda Networks Inc, Campbell, CA (US)

( * ) Notice: Subject to any disclaimer, the term of this patent is extended or adjusted under 35 U.S.C. 154(b) by 233 days.

(21) Appl. No.: 12/268,446

(22) Filed: Nov. 11, 2008

(65) Prior Publication Data

US 2010/0121981 A1 May 13, 2010

(51) Int. Cl.
*G06F 15/16* (2006.01)
*H04L 9/32* (2006.01)

(52) U.S. Cl. ........................................ 709/245; 713/170

(58) Field of Classification Search .................. 709/202, 709/204, 220–226, 245; 358/1.15; 705/6, 705/1, 28, 26, 27, 56, 35, 37, 44, 10; 717/121, 717/126, 177, 101; 707/100, 10; 714/25–34
See application file for complete search history.

(56) References Cited

U.S. PATENT DOCUMENTS

| 7,296,155 | B1 * | 11/2007 | Trostle et al. | ................. 713/170 |
| 2002/0010798 | A1 * | 1/2002 | Ben-Shaul et al. | ........... 709/247 |
| 2006/0161444 | A1 * | 7/2006 | Lubrecht et al. | ................. 705/1 |
| 2007/0261112 | A1 * | 11/2007 | Todd et al. | ....................... 726/11 |

OTHER PUBLICATIONS

IETF RFC 3833 Aug. 2004 Threat Analysis of the Domain Name System (DNS).
IETF RFC 1034 Nov. 1987 Domain Names—Concepts and Facilities.

* cited by examiner

*Primary Examiner* — Joseph E Avellino
*Assistant Examiner* — Mark O Afolabi
(74) *Attorney, Agent, or Firm* — Patentry (57) ABSTRACT

Disclosed is a method, a computer system, and a computer readable media product that contains a set of computer executable software instructions for directing the computer to execute a process for independent confirmation of DNS replies to foil DNS cache poisoning attacks. The process comprises comparing a plurality of DNS replies for an exact or predefined "close enough" match as a condition for blocking or forwarding a DNS reply to a resolver. The tangible beneficial result is to prevent the success of a dns cache poisoning attack from diverting a user to a malicious site on the internet.

17 Claims, 12 Drawing Sheets

VERIFICATION OF DNS ACCURACY IN CACHE POISONING

BACKGROUND

In July 2008 Dan Kaminsky disclosed a discovery of a significant number of problems with "DNS Cache Poisoning". The DNS vulnerability stems from shortcomings in the way servers try to ensure IP address information comes from bona fide sources rather than those controlled by miscreants. To prevent tampering, DNS queries include a random transaction number. The response is only considered valid only if it contains the same number.

What Kaminsky discovered is that this safeguard can be easily circumvented because there were only 65,536 possible transaction IDs. By flooding a DNS server with multiple requests for a domain name with slight variations, for example, 1.google.com, 2.google.com, 3.google.com and so on, and then sending many bogus responses with many different transaction ids, an attacker can vastly improve the chances of the DNS server accepting one of his bogus responses.

The United States Computer Emergency Readiness Team (US-CERT) issued a Vulnerability Note VU#800113: Multiple DNS implementations vulnerable to cache poisoning Overview—Deficiencies in the DNS protocol and common DNS implementations facilitate DNS cache poisoning attacks.

I. Description—The Domain Name System (DNS) is responsible for translating host names to IP addresses (and vice versa) and is critical for the normal operation of internet-connected systems. DNS cache poisoning (sometimes referred to as cache pollution) is an attack technique that allows an attacker to introduce forged DNS information into the cache of a caching nameserver. DNS cache poisoning is not a new concept; in fact, there are published articles that describe a number of inherent deficiencies in the DNS protocol and defects in common DNS implementations that facilitate DNS cache poisoning. The following are examples of these deficiencies and defects:

Insufficient transaction ID space—The DNS protocol specification includes a transaction ID field of 16 bits. If the specification is correctly implemented and the transaction ID is randomly selected with a strong random number generator, an attacker will require, on average, 32,768 attempts to successfully predict the ID. Some flawed implementations may use a smaller number of bits for this transaction ID, meaning that fewer attempts will be needed. Furthermore, there are known errors with the randomness of transaction IDs that are generated by a number of implementations. Amit Klein researched several affected implementations in 2007. These are known to those skilled in the art.

Multiple Outstanding Requests

Some implementations of DNS services contain a vulnerability in which multiple identical queries for the same resource record (RR) will generate multiple outstanding queries for that RR. This condition leads to the feasibility of a 'birthday attack,' which significantly raises an attacker's chance of success. A number of vendors and implementations have already added mitigations to address this issue.

Fixed Source Port for Generating Queries

Some current implementations allocate an arbitrary port at startup (sometimes selected at random) and reuse this source port for all outgoing queries. In some implementations, the source port for outgoing queries is fixed at the traditional assigned DNS server port number, 53/udp.

Recent additional research into these issues and methods of combining them to conduct improved cache poisoning attacks have yielded extremely effective exploitation techniques. Caching DNS resolvers are primarily at risk—both those that are open (a DNS resolver is open if it provides recursive name resolution for clients outside of its administrative domain), and those that are not. These caching resolvers are the most common target for attackers; however, stub resolvers are also at risk.

Because attacks against these vulnerabilities all rely on an attacker's ability to predictably spoof traffic, the implementation of per-query source port randomization in the server presents a practical mitigation against these attacks within the boundaries of the current protocol specification. Randomized source ports can be used to gain approximately 16 additional bits of randomness in the data that an attacker must guess. Although there are technically 65,535 ports, implementers cannot allocate all of them (port numbers<1024 may be reserved, other ports may already be allocated, etc.). However, randomizing the ports that are available adds a significant amount of attack resiliency. It is important to note that without changes to the DNS protocol, such as those that the DNS Security Extensions (DNSSEC) introduce, these mitigations cannot completely prevent cache poisoning. However, if properly implemented, the mitigations reduce an attacker's chances of success by several orders of magnitude and make attacks impractical.

II. Impact —An attacker with the ability to conduct a successful cache poisoning attack can cause a nameserver's clients to contact the incorrect, and possibly malicious, hosts for particular services. Consequently, web traffic, email, and other important network data can be redirected to systems under the attacker's control.

Once a DNS server has received non-authentic data and caches it for future performance increase, it is considered poisoned, supplying the non-authentic data to the clients of the server until it expires the data.

Normally, an Internet-connected computer uses a DNS server provided by the computer owner's Internet Service Provider, or ISP. This DNS server generally serves the ISP's own customers only and contains a small amount of DNS information cached by previous users of the server. A poisoning attack on a single ISP DNS server can affect the users serviced directly by the compromised server or indirectly by its downstream server(s) if applicable.

To perform a cache poisoning attack, the attacker exploits a flaw in the Domain Name System architecture which allows it to accept incorrect information. If the server does not correctly validate DNS responses to ensure that they have come from an authoritative source, the server will end up caching the incorrect entries locally and serve them to users that make the same request.

This technique can be used to replace arbitrary content for a set of victims with content of an attacker's choosing. For example, an attacker poisons the IP address DNS entries for a target website on a given DNS server, replacing them with the IP address of a server he controls. He then creates fake entries for files on the server they control with names matching those on the target server. These files could contain malicious content, such as a worm or a virus. A user whose computer has referenced the poisoned DNS server would be tricked into thinking that the content comes from the target server and unknowingly download malicious content.

An early simple variant of DNS of cache poisoning involved redirecting the nameserver of the attacker's domain to the nameserver of the target domain, then assigning that nameserver an IP address specified by the attacker. A vulnerable server would cache an additional A-record (IP address) provided in response allowing the attacker to resolve queries to the domain provided as an additional A-record.

A second later variant of DNS cache poisoning involves redirecting the nameserver of another domain unrelated to the original request to an IP address specified by the attacker. A vulnerable server would cache the unrelated authority information allowing the attacker to resolve queries to the unrelated domain.

The third and most serious variant of DNS cache poisoning, which is called DNS Forgery, involves beating the real answer to a recursive DNS query back to the DNS server. DNS requests contain a 16-bit transaction id, used to identify the response associated with a given request. If the attacker can successfully predict the value of the transaction id and return a reply first, the server will accept the attacker's response as valid. If the server randomizes the source port of the request, the attack may become more difficult, as the fake response must be sent to the same port that the request originated from.

By sending a number of simultaneous DNS requests to the server to force it to send more recursive requests, the probability of successfully predicting one of the request transaction ids increases to a high level.

The problems are inherent in the DNS protocol and its usage of UDP transfers. A proposed solution DNSSEC has been resistant to adoption because of the lack of critical mass. There is no immediate payback for adopting DNSSEC to the early adopters. A most serious attack is hijacking authority records. An attack starts with a flurry of queries, each for a different random name under the main domain. The first request causes the nameserver to perform the usual root-first resolution, but it eventually caches the valid values. Subsequent queries within this domain go directly to that nameserver, skipping the root steps.

But a request for a different random name intentionally chosen to be not found in cache causes an immediate query to the valid ns1 server. The attacker then massively floods forged data at the victim about that second random name. Although no one forged reply has a high probability of success, a tiny percentage of a large number is non-zero.

By sending many forged replies for each random name query before the real reply arrives from the real nameserver the attacker has good chance of success at little cost.

By poisoning the Authority records for .COM and the like, the victim nameserver will route all DNS lookups to the attacker's nameservers. This effectively hijacks all names under that top level.

DNS poisoning and other methods of mis-representing DNS could lead to an unsuspecting person thinking he is at a website that is different than the website he is really viewing. This could lead the person to enter confidential passwords, account, credentials or other information. It would be difficult if not impossible for a user to detect this attack. There are many products that sit in the path of the DNS traffic and route the data for the DNS request and the DNS response. These products include Ethernet switches, IPS devices, Routers, web filters, and many others. A problem with solutions to address the vulnerability in the domain name system is that they can be undone or substantially weakened by routers, firewalls, proxies, and other gateway devices that perform Network Address Translation (NAT)—more specifically Port Address Translation (PAT)—which often rewrite source ports in order to track connection state. When modifying source ports, PAT devices can reduce source port randomness implemented by nameservers and stub resolvers (conversely a PAT device can also increase randomness). A PAT device can reduce or eliminate improvements gained by patching DNS software to implement source port randomization. Thus it can be appreciated that what is needed is a way to automatically verify DNS accuracy by independent means.

SUMMARY OF THE PREFERRED EMBODIMENTS

The foregoing and other problems are addressed and solved by methods and apparatus in accordance with the teachings of this invention.

The invention is to implement a DNS "double check" to an independent DNS server. When a DNS request is observed in a passive manner by the checking device it sends a request to 1 or more alternative DNS servers. The protocol to communicate with these alternative DNS servers could be a standard DNS protocol or a more secure protocol. The secondary DNS server could be either a public service, a private service, or a secondary dns server setup by the network owner.

The checking device holds the response to the original DNS request until it receives a response from at least one secondary check. Once it receives the response on the secondary check it compares the two responses. If they are the same or close enough that is within a defined range, then it allows the response to proceed to the requester. In this way two or more DNS servers are checked and verified. To fool this system would require the attack and compromising of 2 or more dns servers in the same way at the same time. Furthermore determining which 2 or more DNS servers to compromise would be difficult to determine by any attacker thereby increasing safety.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DISCLOSURE OF EMBODIMENTS IN A COMPUTER SYSTEM

In an embodiment of a computer executed method for verifying DNS results, the invention controls a processor to perform the following steps:

passively observing a domain name system (dns) request from a resolver to a first server;
replicating the dns request;
transmitting the duplicate dns requests one or more times to at least one secondary server;
holding any response to the original resolver until a plurality of dns replies are received; and
allowing a response to the original resolver on the condition that two dns replies match in content.

In an embodiment, a computer executed method for obtaining verified DNS results tangibly encoded on computer readable media, controls a processor to perform the following steps:
actively receiving a domain name system (dns) request from a resolver;
replicating the dns request;
transmitting the dns request to at least one secondary server;
holding a response to the original resolver until at least one dns reply from a secondary server is received; and
responding to the original resolver on the condition that two dns replies match in content.

A method is disclosed for verifying DNS accuracy comprising the following steps:
receiving a DNS query and relaying a DNS query to a plurality of DNS servers;
receiving a plurality of DNS responses and comparing the contents;
truncating the DNS response to remove authority information unrelated to the original query;
voting the plurality of DNS responses to determine a winner; and
relaying the winning DNS response to the originator.

One of the DNS servers is a trusted DNS server provided by a service, or provides a digital certificate for authentication. In an embodiment the DNS servers is selected pseudo-randomly.

To add further protection to a DNS client which is vulnerable to guessing an embodiment changes the source port of the dns query pseudo-randomly and relays a plurality of dns requests to a plurality of dns servers.

To prevent the race condition of first reply wins, an embodiment compares the first and nth dns reply wherein n is the number of dns servers queried.

In an embodiment, a computer implement method comprises the following steps:
receiving a domain name system (dns) request from a resolver;
replicating the dns request;
transmitting the dns request to a primary server and at least one secondary server; and
responding to the original resolver on the condition that two dns replies match in content.

The system is further complicated by the fact that for some web sites or web services or internet services there may be multiple servers that would be legally returned for a dns request. This means that a mismatch might occur. There are many techniques to overcome this problem.

In an embodiment a bit mask allows matching on the n most significant bits of an IP address without an exact match to a specified IP address. An embodiment of a "close enough" match includes but is not limited to: two IP addresses in the same subnet, two IP addresses within a range of 256, two IP addresses owned by the same company or entity, two IP addresses within a range of 16, 32, 64, 128, or some policy controlled range depending on the geographical locus of the base address. Performing a reverse DNS query to determine that two IP addresses are registered to the same name would be an embodiment. Failure to match exactly or close enough would result in blocking a response.

In an embodiment, a reverse resolver IP database could be used to verify the accuracy rather than a secondary DNS request. A reverse DNS request could also be used.

In an embodiment, at least three sources of DNS information can be queried and a majority or a plurality of results can be voted to determine which result to send as a reply.

A preferred embodiment further comprises the step of generating a transaction id and source port for a dns request using a first pseudo-random algorithm.

A preferred embodiment further comprises the steps of generating a transaction id and source port for a first dns request using a first pseudo-random algorithm and generating a transaction id and source port for a second dns request using a second pseudo-random algorithm and comparing the contents of the first dns request and the second dns request.

The apparatus for providing the second dns checking can be implemented in any physical or logical device in the path between a resolver and the external network including but not limited to the following: a switch, a hub, a router, a dns server, a firewall, and a gateway.

A negative result, meaning a contradiction between two dns servers results in a termination. Embodiments of a termination include but are not limited to 1. not passing a response to the query, 2. terminating the session, 3. injecting a different reply than either of the two received results.

A preferred embodiment dynamically selects from a plurality of pseudo-random algorithms for generating a transaction id and source port. A preferred embodiment flushes cache if inconsistent responses are received.

Figure 1:
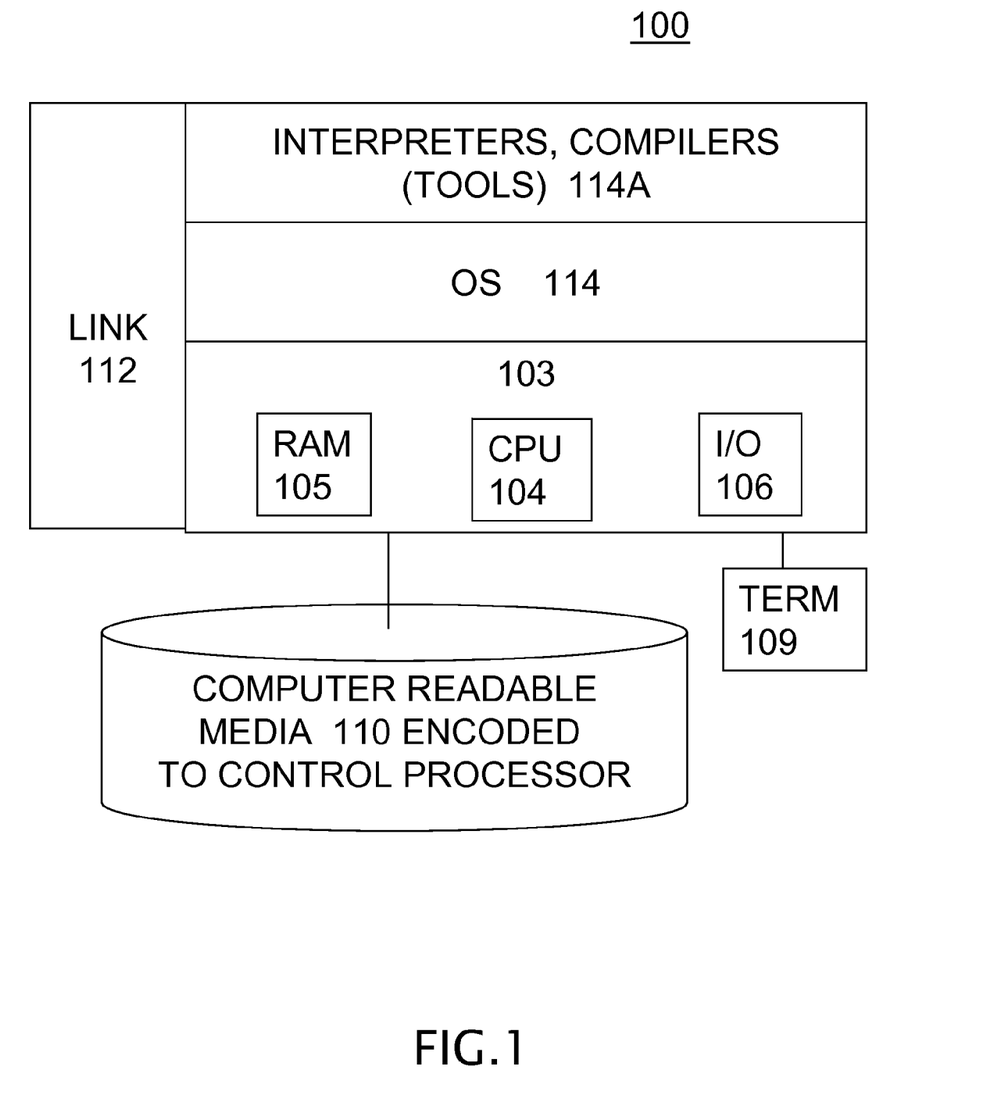
FIG. 1 is a block diagram of a data processor suitable for the implementation of this invention.

FIG. 1 shows a block diagram of a typical computing system 100 where the preferred embodiment of this invention can be practiced. The computer system 100 includes a computer platform having a hardware unit 103, that implements the methods disclosed below. The hardware unit 103 typically includes one or more central processing units (CPUs) 104, a memory 105 that may include a random access memory (RAM), and an input/output (I/O) interface 106. Various peripheral components may be connected to the computer platform 102. Typically provided peripheral components include an external data storage device (e.g. tape or disk) 110 where the data used by the preferred embodiment is stored. A link 112 may also be included to connect the system 100 to one or more other similar computer systems. The link 112 may also provide access to the global Internet. An operating system (OS) 114 coordinates the operation of the various components of the computer system 100, and is also responsible for managing various objects and files, and for recording certain information regarding same. Lying above the OS 114 is a software tools layer 114A containing, for example, compilers, interpreters and other software tools. The interpreters, compilers and other tools in the layer 114A run above the operating system and enable the execution of programs using the methods known to the art.

One suitable and non-limiting example of computer system 100 is the Barracuda Web Filter. Another example is a personal computer running the Linux operating system. An example of a suitable CPU is a Pentium™ III processor (trademark of the Intel Corporation); examples of an operating systems is GNU/Linux; examples of an interpreter and a compiler are a Perl interpreter and a C++ compiler. Those skilled in the art will realize that one could substitute other examples of computing systems, processors, operating systems and tools for those mentioned above. As such, the teachings of this invention are not to be construed to be limited in any way to the specific architecture and components depicted in FIG. 1.

Figure 2:
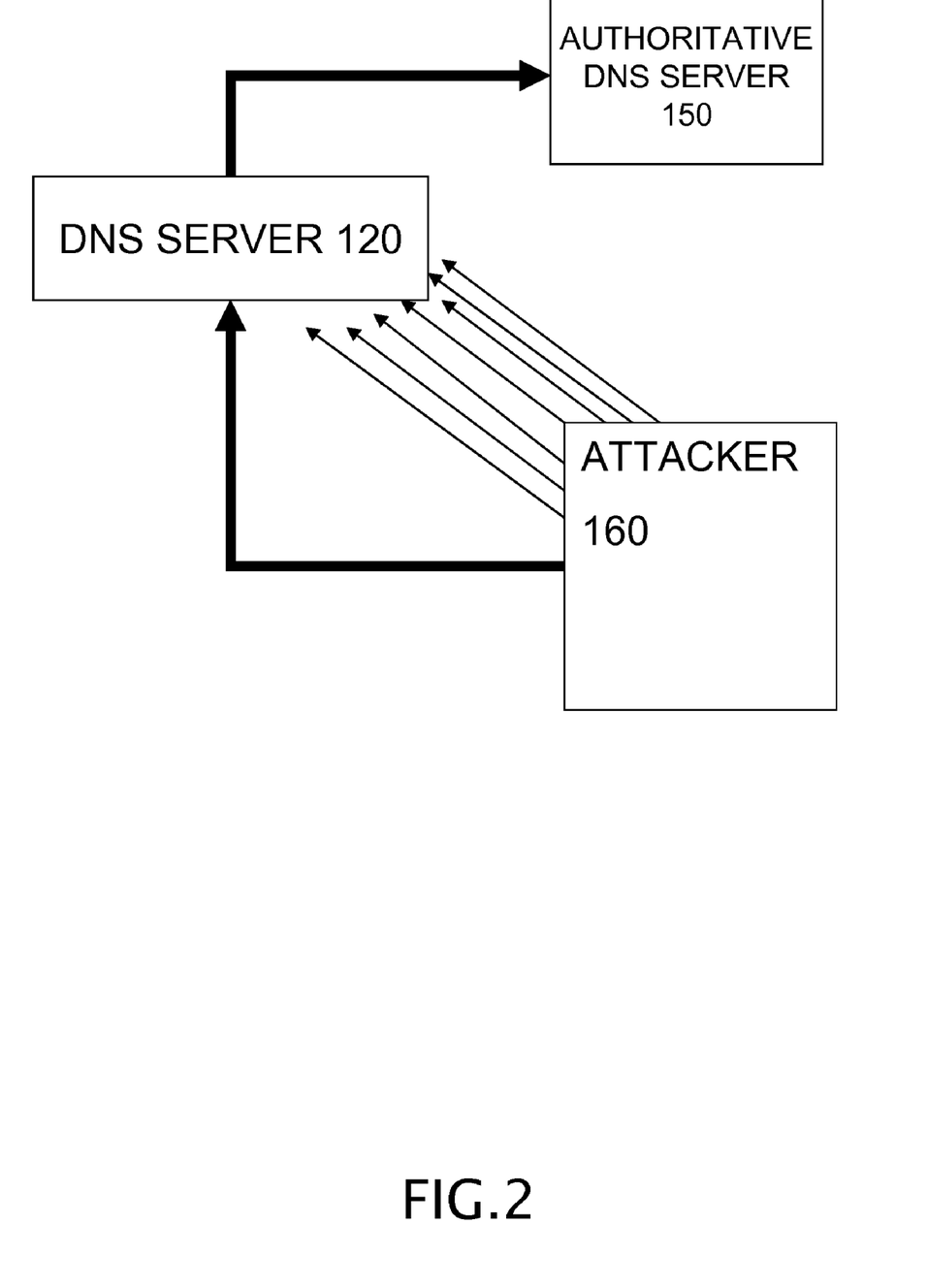
FIG. 2 is a block diagram of a network illustrating a dns cache poisoning attack.
Figure 3:
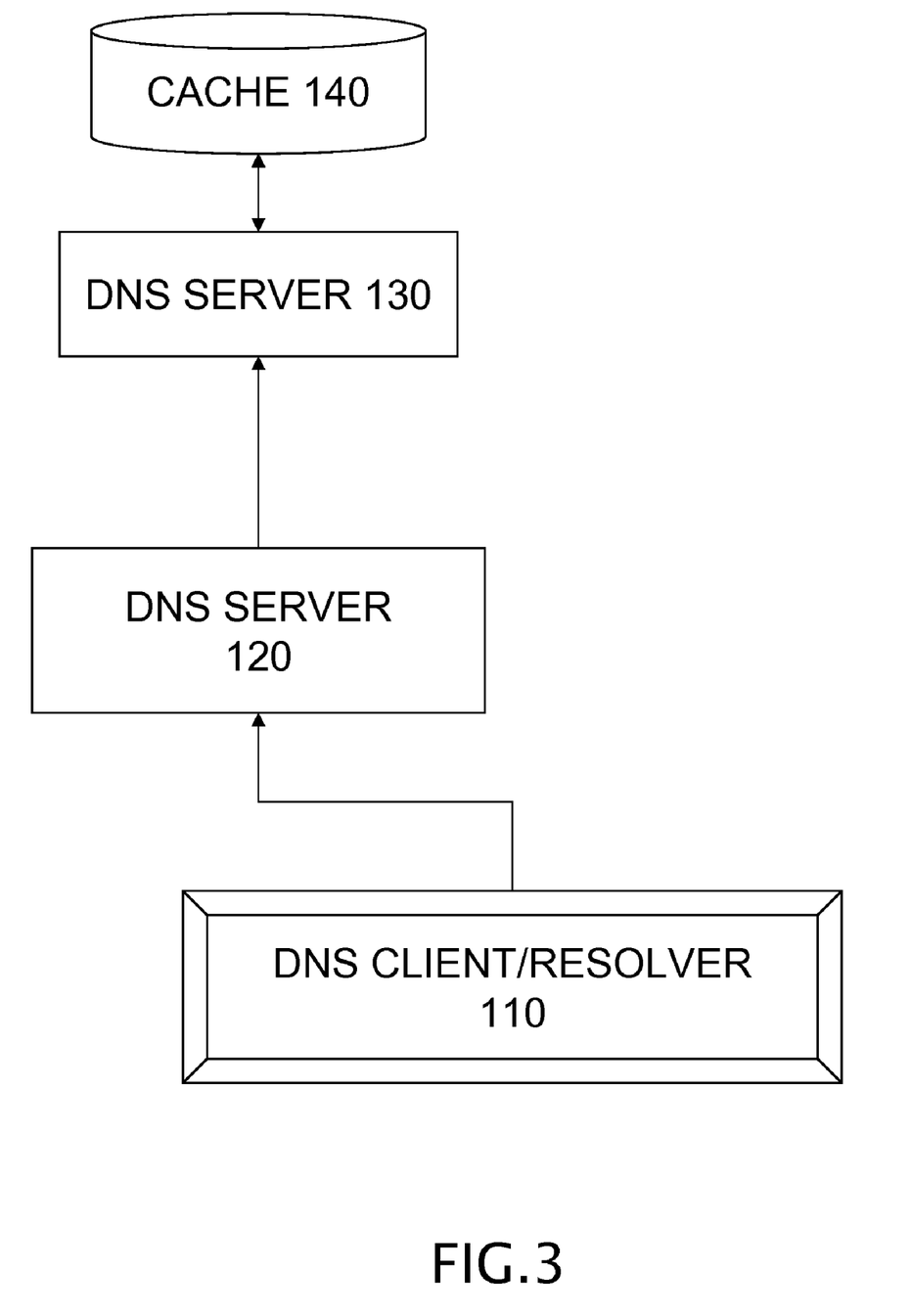
FIG. 3 is a block diagram of a network handling a conventional dns query.
Figure 4:
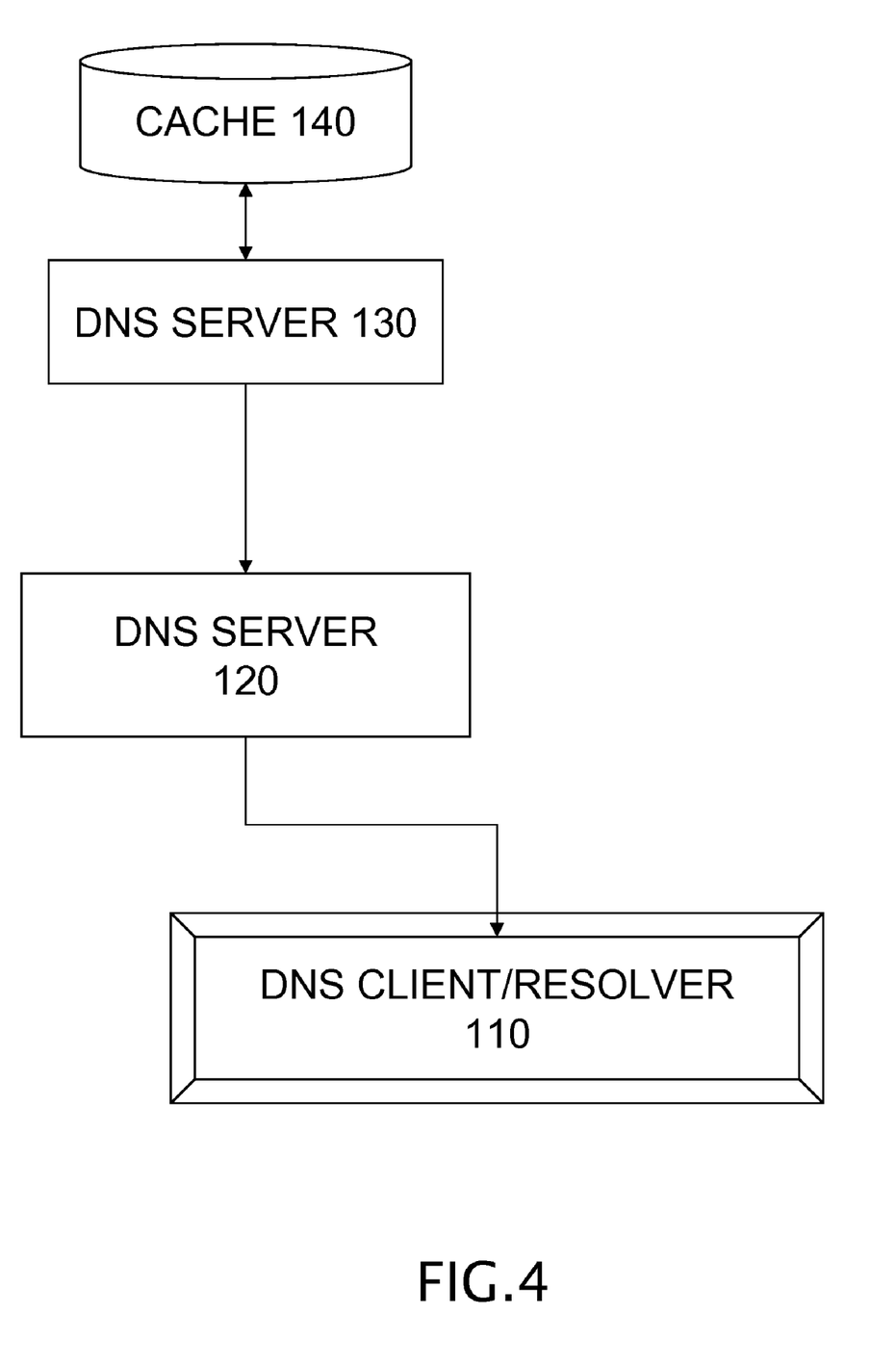
FIG. 4 is a block diagram of a network handling a conventional dns reply.

Referring now to FIG. 2, an attacker attempts to poison cache by forcing a DNS Server 120 to query for a hitherto unknown IP address. Knowing the forthcoming query, the attacker floods the victim with bogus replies and attempts to guess the transaction id and spoof the victim before the authoritative server provides the correct resource record. Referring now to FIG. 3, a block diagram of a normal dns query process is illustrated, wherein a client 110 requires an IP address, queries its local dns server 120, which goes to a second dns server 130. If the reply is in cache 140 it is returned. If an answer is not found in cache, a query is sent to an authoritative server. Referring now to FIG. 4, a block diagram of a normal dns reply is illustrated. The IP address found in cache of DNS server 130 is sent to DNS server 120 which provides it to the client 110. If the cache 140 has been poisoned, every client who relies upon dns server 130 will receive bogus IP addresses.

Figure 5:
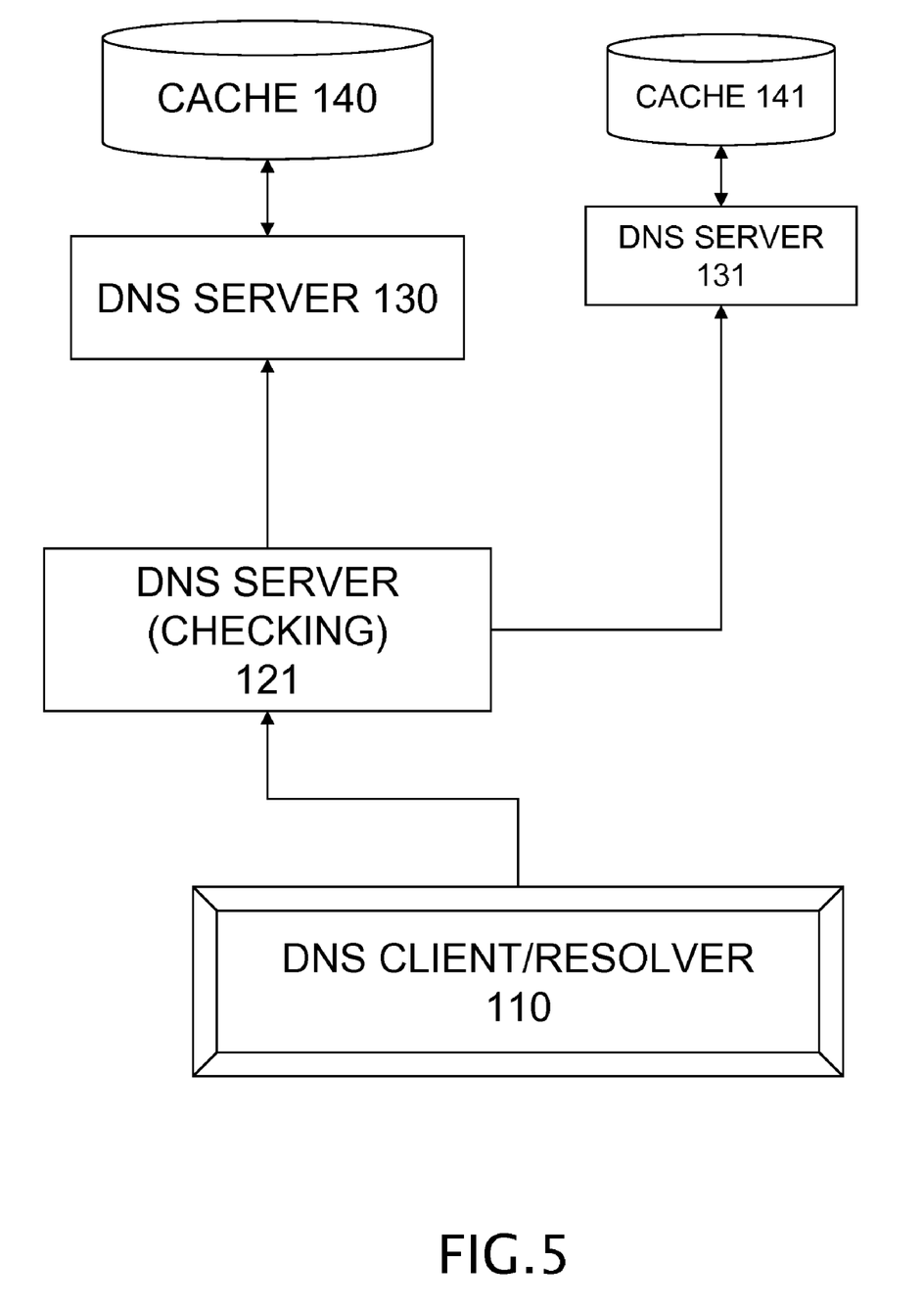
FIG. 5 is a block diagram of a network handling a dns second check.
Figure 6:
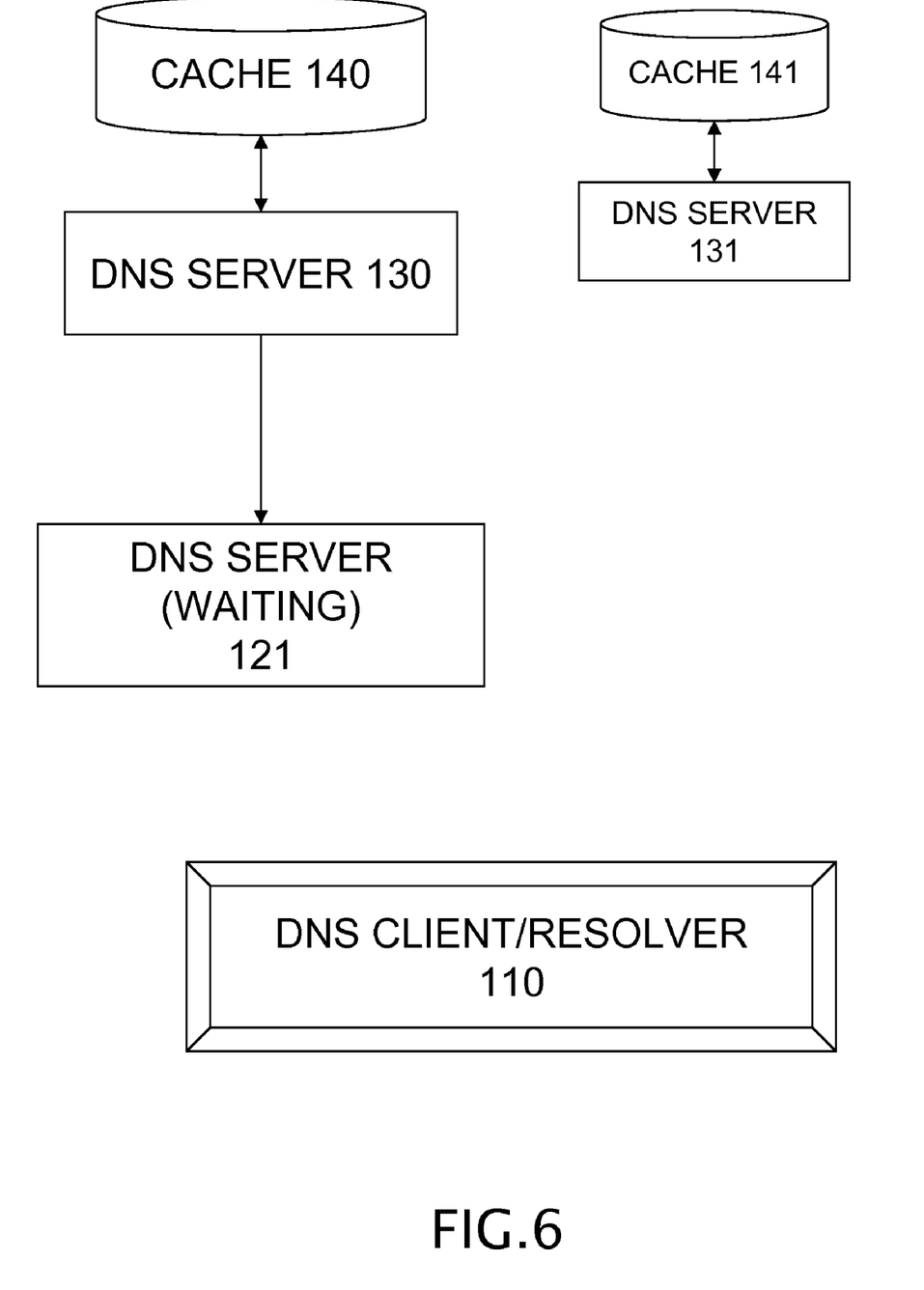
FIG. 6 is a block diagram of a network waiting for a dns second check.
Figure 7:
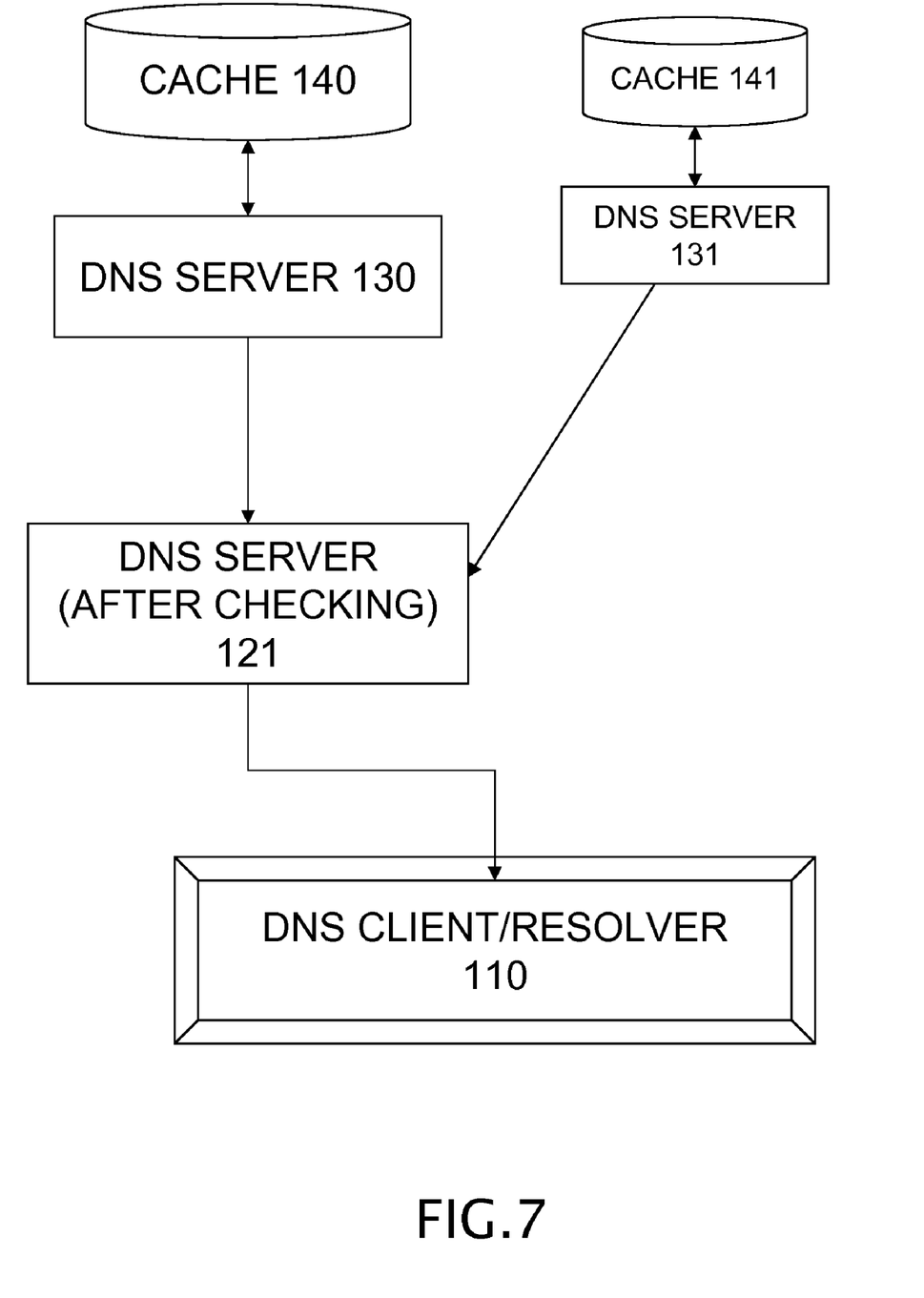
FIG. 7 is a block diagram of a network successfully providing dns second check.

Referring now to FIG. 5, an embodiment of the present invention is illustrated with a DNS server 121 performing a checking process by duplicating the query sent to dns server 130 and querying dns server 131 which has its own cache. It is the observation of the inventor that it is less likely and harder to poison two caches with the same result. The present invention further comprises a dns server 131 which is protected and may be hidden from attack. Referring now to FIG. 6, the dns server 121 receives a reply from dns server 130 but the process of the present invention is to withhold the reply from the client 110. Referring to FIG. 7, the dns server 121 receives a second reply from a second dns server 131 and upon matching the two replies, forwards the response to the client 110.

Figure 8:
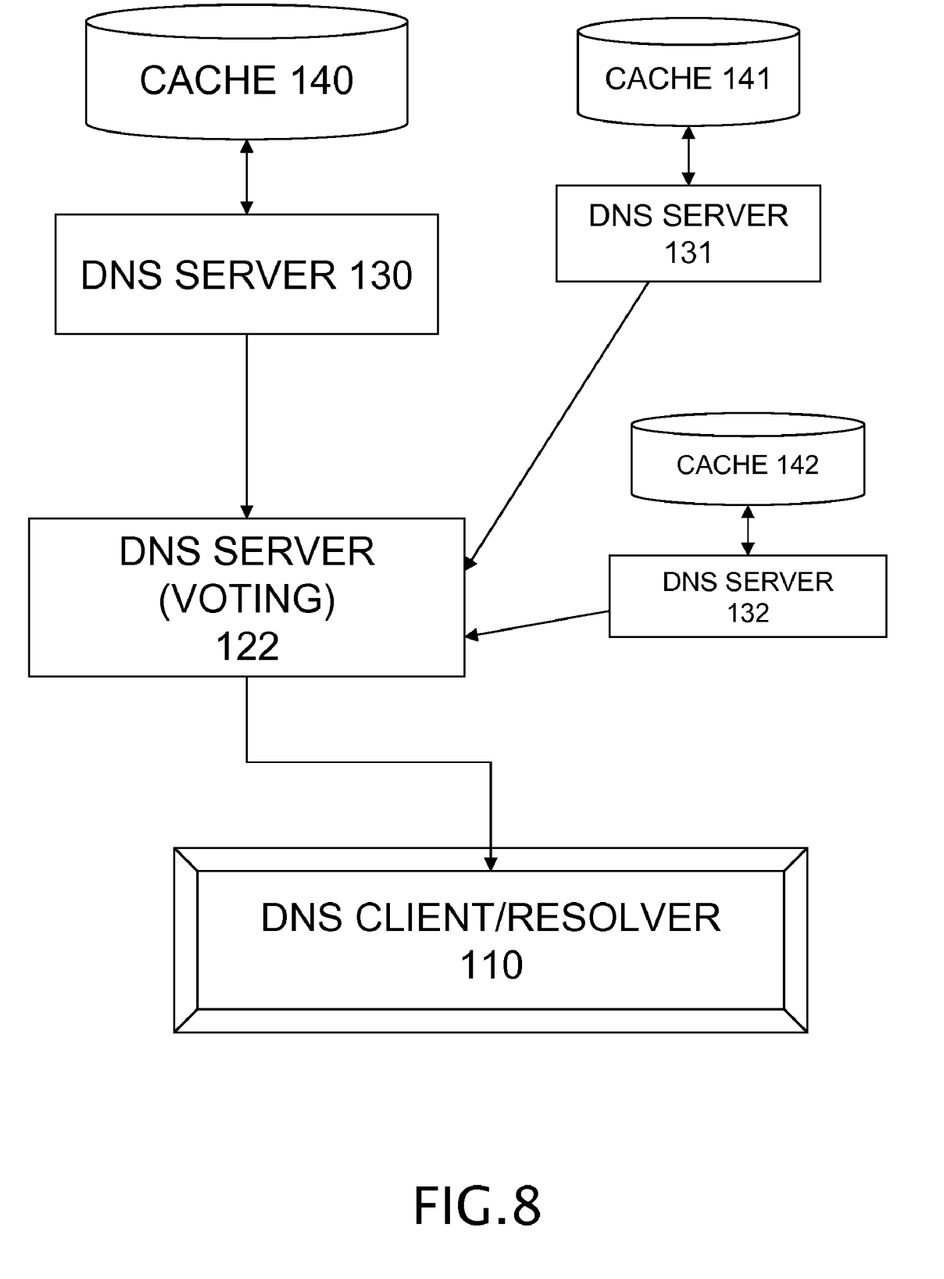
FIG. 8 is a block diagram of a network voting on results of multiple replies.

Referring to FIG. 8, an embodiment of the invention is the method of querying a plurality of second dns servers 131 and 132, and voting on the replies. Voting could require a unanimous result or a majority result in embodiments. The result of voting can be to forward the winning reply to the client 110 or withhold any reply from the client 110.

Figure 9:
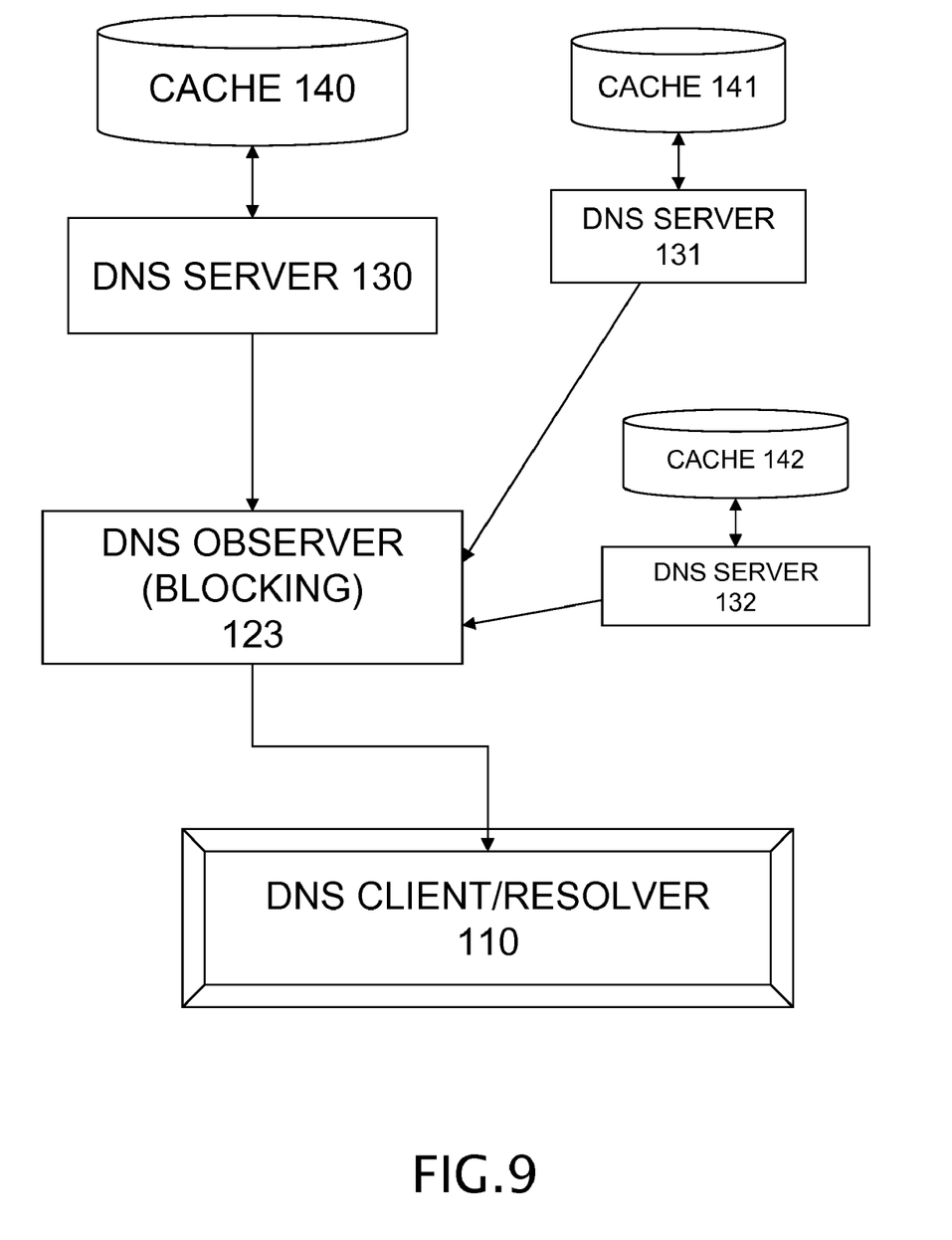
FIG. 9 is a block diagram of a network blocking an observed query and reply.

Referring to FIG. 9, an embodiment of the invention is a DNS observer, any logical entity in the path between a client 110 and a dns server 130. The DNS observer is not itself a server but duplicates queries and blocks replies until a match is received from at least one second dns server.

Figure 10:
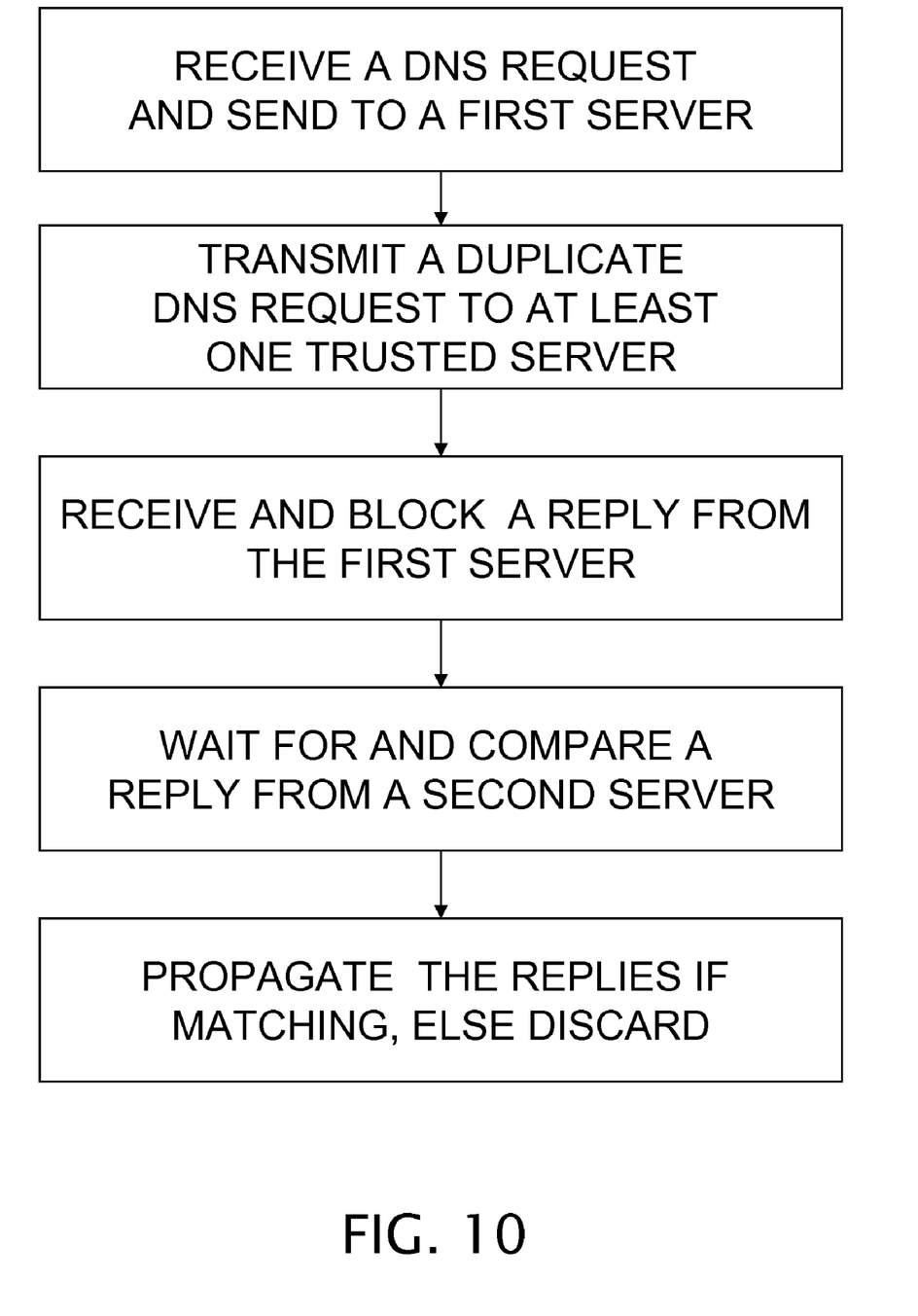
FIG. 10 is a flowchart of an embodiment of the invention.
Figure 11:
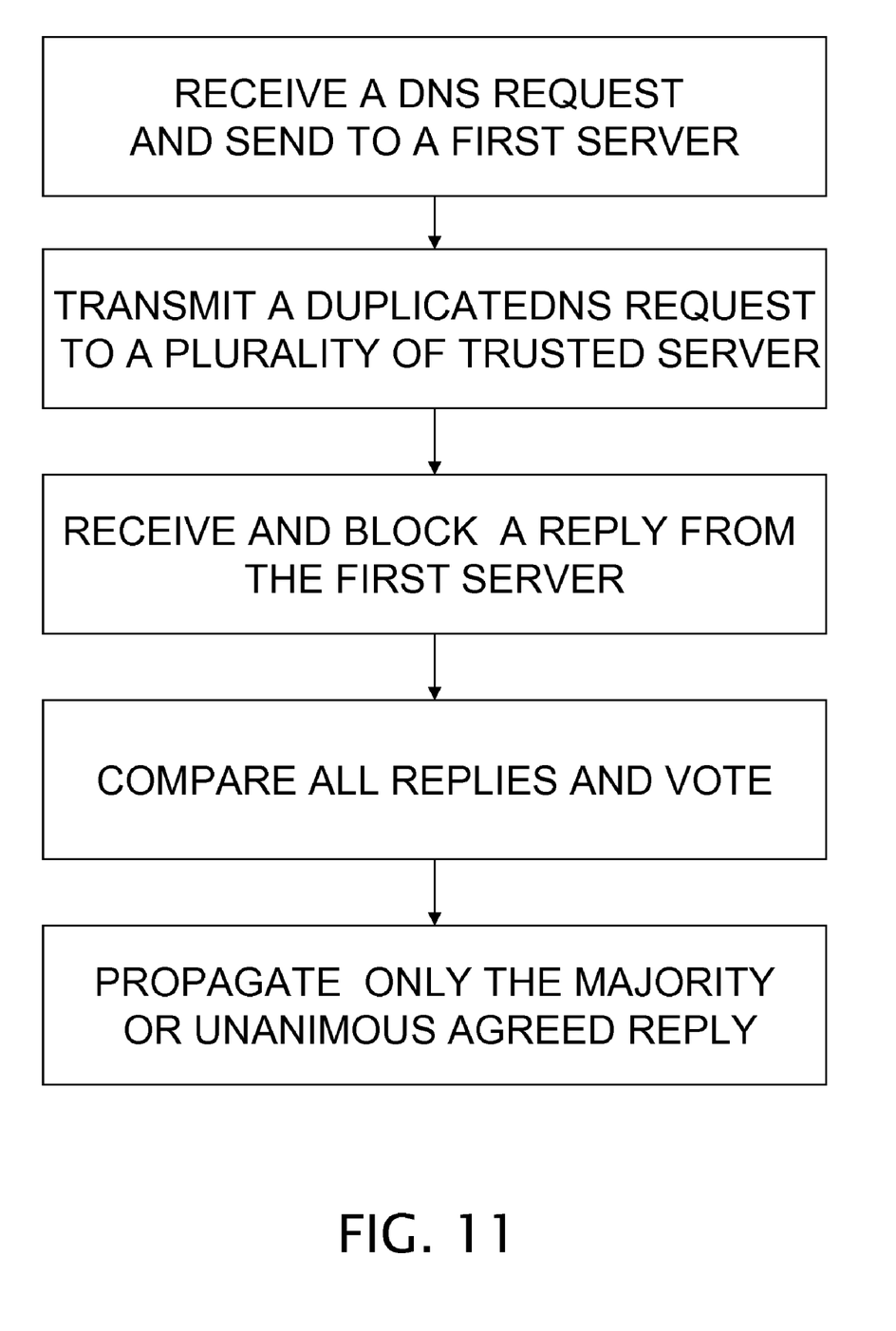
FIG. 11 is a flowchart of an embodiment of the invention.
Figure 12:
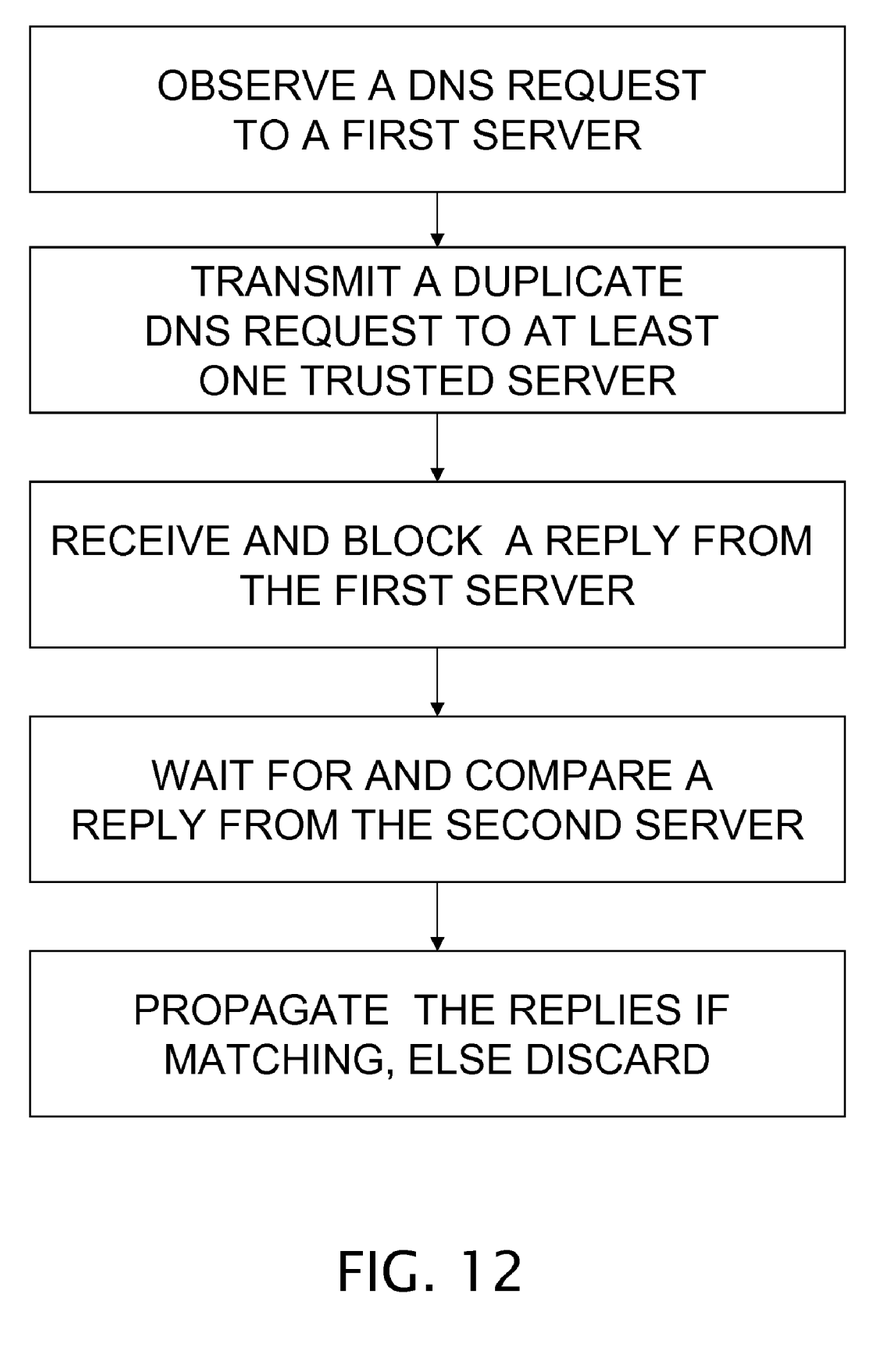
FIG. 12 is a flowchart of an embodiment of the invention.

Referring to FIG. 10, a flowchart illustrates the steps comprising receiving a dns request, duplicating the request, transmitting the original and the duplicate requests to different servers, waiting for and comparing replies, and propagating the reply if there is a match. Referring to FIG. 11, a flowchart illustrates the steps if voting based on three or more replies are received. In an embodiment a unanimous result is required. In an embodiment a majority result will be propagated to the client. Referring to FIG. 12 a flowchart illustrates the step if a passive observer rather than a dns server performs the method of the present invention. This could be a firewall as a non-limiting example.

CONCLUSION

The present invention is distinguished by obtaining at least a second reply to a dns query and comparing the content of at least two dns resource record requests before providing a response to a resolver. Even if a cache has been poisoned, the present invention prevents the inaccurate information from being provided to the requesting resolver.

Based on the foregoing description it should be appreciated that this invention also encompasses a computer readable media product containing a set of computer executable software instructions for directing the computer system 100 to execute a process for independent confirmation of DNS replies to foil DNS cache poisoning attacks. The process comprises comparing a plurality of DNS replies for an exact or predefined "close enough" match as a condition for blocking or forwarding a DNS reply to a resolver. The tangible beneficial result is to prevent the success of a dns cache poisoning attack from diverting a user to a malicious site on the internet.

The above discussion and description includes illustrations to support the understanding and appreciation of the invention but should be recognized as not limiting the scope which is defined by the claims following:

Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A computer executed method for adapting a processor from computer readable media to operate a domain name system (DNS) server apparatus resistant to cache poisoning comprising the following steps:
   receiving, at a DNS server, a domain name system (dns) request from a resolver;
   replicating the dns request;
   generating a transaction id and source port for a first dns request using a first pseudo-random algorithm and generating a transaction id and source port for a second dns request using a second pseudo-random algorithm;
   transmitting one of the replicated dns requests to a primary server and an other replicated dns request to at least one secondary server;
   blocking a first DNS reply to the resolver until a plurality of DNS replies are received;
   receiving a reply from each of at least two dns servers;
   comparing the reply Internet Protocol (IP) address from a first dns request with the reply from a second dns request; and
   responding to the resolver on the condition that two dns IP address replies match.

2. A computer implemented method for foiling domain name system DNS cache poisoning attacks by controlling a processor from computer readable media to manage a DNS server comprising the following steps:
   receiving a DNS query from an originator;
   relaying said DNS query to a plurality of DNS servers, by transmitting each DNS query with a different transaction id and source port;
   blocking a first DNS reply to the originator until a plurality of DNS replies are received;
   receiving a plurality of DNS servers, containing said different transaction id and source port, from said plurality of DNS servers;
   comparing the Internet Protocol (IP) address contained in the reply from a first DNS server with the IP address contained in the reply from a second DNS server; and
   providing to the originator a substantially similar IP address if the IP address of the reply to the first DNS request is substantially similar to the IP address of the reply to the second DNS request.

3. The method of claim 2 wherein one of the DNS servers provides a digital certificate for authentication.

4. The method of claim 2 wherein at least one of the DNS servers is selected pseudo-randomly.

5. The method of claim 2 further comprising the step of:
turning Port Address Translation in network routers off.

6. A method for verifying domain name system DNS accuracy comprising:
receiving a DNS query from an initiating resolver:
duplicating said DNS query;
generating a different transaction id and source port for each duplicate dns query using by randomizing the source port of each query;
transmitting one of the duplicate DNS queries to at least three DNS servers;
blocking a first DNS reply to the initiating resolver until a plurality of DNS replies are received;
receiving a reply from each of at least two DNS servers, said reply containing one of the generated different transaction id and source port; and
comparing the Internet Protocol (IP) address contained in the reply to a first DNS request with the IP address contained in the reply to a second DNS request to determine a match.

7. The method of claim 6 further comprising:
receiving a plurality of replies, and forwarding the reply having a majority of results which match to the initiating resolver.

8. The method of claim 6 wherein a match comprises:
a reverse DNS lookup of a first IP address and a second IP address results in the same host and domain name.

9. The method of claim 6 wherein a match comprises:
a first IP address is within a certain range of a second IP address.

10. The method of claim 6 wherein a match comprises:
a first IP address and a second IP address are registered to the same entity.

11. The method of claim 6 wherein a match comprises:
a mask of n least significant bits applied to a first IP address and a second IP address result in the same result.

12. An apparatus to protect a Domain Name System (DNS) cache from DNS poisoning attacks comprising a computer platform which comprises
a hardware unit, the hardware unit comprises one or more central processing units (CPUs), a random access memory (RAM), an input/output (I/O) interface, an external data storage device, and a network link to connect to the global Internet;
an operating system to coordinate the operation of the various components of the computer system, manage various objects and files, and record certain information regarding same;
said computer platform communicatively coupled to a machine readable store encoded with a computer program to adapt the hardware unit and link:
to receive a DNS request from an originator;
to replicate the DNS request;
to generate a transaction id and source port for a first dns request using a first pseudo-random algorithm and to generate a transaction id and source port for a second dns request using a second pseudo-random algorithm;
to transmit one of the replicated DNS requests to a primary server and an other replicated DNS request to at least one secondary server;
to block a first DNS reply to the originator until a plurality of DNS replies are received;
to receive a reply from each of at least two DNS servers validated by the generated transaction id and source port;
to compare the IF address contained in the reply from a first DNS request with the IP address contained in the reply from a second DNS request; and
to provide to the originator a substantially similar IP address if the IP address of the reply to the first DNS request is substantially similar to the IP address of the reply to the second DNS request.

13. A system comprising the apparatus of claim 12 communicatively coupled to at least one DNS server which provides a digital certificate for authentication.

14. The apparatus of claim 12 wherein the apparatus is a network switch or hub.

15. The apparatus of claim 12 wherein the apparatus is a router.

16. The apparatus of claim 12 wherein the apparatus is a firewall

17. The apparatus of claim 12 further comprising a DNS cache coupled to said one or more cpus and said network link wherein the apparatus is a DNS server.

* * * * *